US007008971B2

(12) United States Patent
Taft, III et al.

(10) Patent No.: US 7,008,971 B2
(45) Date of Patent: *Mar. 7, 2006

(54) COMPOSITE POLYMER ELECTROLYTES FOR PROTON EXCHANGE MEMBRANE FUEL CELLS

(75) Inventors: Karl Milton Taft, III, Honolulu, HI (US); Matthew Robert Kurano, Honolulu, HI (US); Arunachala Nadar Mada Kannan, Honolulu, HI (US)

(73) Assignee: Hoku Scientific, Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/644,227

(22) Filed: Aug. 19, 2003

(65) Prior Publication Data

US 2004/0048129 A1 Mar. 11, 2004

Related U.S. Application Data

(63) Continuation-in-part of application No. 10/219,083, filed on Aug. 13, 2002, now Pat. No. 6,630,265.

(51) Int. Cl.
C08J 5/20 (2006.01)
H01M 8/10 (2006.01)
C25B 13/00 (2006.01)

(52) U.S. Cl. .............................. 521/27; 429/30; 429/33; 204/296

(58) Field of Classification Search ................... 429/30, 429/33; 204/296; 524/445, 186, 431, 236; 521/27; 423/331, 327.1, 332
See application file for complete search history.

(56) References Cited

U.S. PATENT DOCUMENTS

| | | | |
|---|---|---|---|
| 3,282,875 A | 11/1966 | Connolly et al. | 260/29.6 |
| 4,320,224 A | 3/1982 | Rose et al. | 528/125 |
| 4,330,654 A | 5/1982 | Ezzell et al. | 526/243 |
| 4,419,486 A | 12/1983 | Rose | 525/534 |
| 4,625,000 A | 11/1986 | Chao et al. | 525/534 |
| 5,122,587 A | 6/1992 | Heinz et al. | 528/126 |
| 5,248,566 A | 9/1993 | Kumar et al. | 429/19 |
| 5,272,017 A | 12/1993 | Swathirajan et al. | 429/33 |
| 5,438,082 A | 8/1995 | Helmer-Metzmann et al. | 522/149 |
| 5,523,181 A | 6/1996 | Stonehart et al. | 429/192 |
| 5,547,551 A | 8/1996 | Bahar et al. | 204/296 |
| 5,547,777 A | 8/1996 | Richards | 429/32 |
| 5,599,614 A | 2/1997 | Bahar et al. | 442/171 |
| 5,635,041 A | 6/1997 | Bahar et al. | 204/282 |
| 5,716,727 A | 2/1998 | Savinell et al. | 429/33 |
| 5,766,787 A | 6/1998 | Watanabe et al. | 429/33 |
| 5,942,347 A | 8/1999 | Koncar et al. | 429/30 |
| 5,958,354 A | 9/1999 | Thompson et al. | 423/328.1 |
| 5,977,241 A | 11/1999 | Koloski et al. | 524/502 |
| 6,042,958 A | 3/2000 | Denton et al. | 429/30 |
| 6,045,935 A | 4/2000 | Ketcham et al. | 429/30 |
| 6,059,943 A | 5/2000 | Murphy et al. | 204/296 |
| 6,096,449 A | 8/2000 | Fuglevand et al. | 429/13 |
| 6,099,988 A | 8/2000 | Savinell et al. | 429/189 |
| 6,248,469 B1 | 6/2001 | Formato et al. | 429/41 |
| 6,355,149 B1 | 3/2002 | Soczka-Guth et al. | 204/296 |
| 6,387,230 B1 | 5/2002 | Murphy et al. | 204/296 |
| 6,387,556 B1 | 5/2002 | Fuglevand et al. | 429/22 |
| 6,509,441 B1 | 1/2003 | Kerres | 528/391 |
| 6,521,690 B1 | 2/2003 | Ross et al. | 524/445 |
| 6,548,590 B1 | 4/2003 | Koloski et al. | 524/492 |
| 6,552,135 B1 | 4/2003 | Schnurnberger et al. | 525/536 |
| 6,562,891 B1 * | 5/2003 | Tsai et al. | 524/445 |
| 6,576,100 B1 | 6/2003 | Arcella et al. | 204/296 |
| 6,630,265 B1 * | 10/2003 | Taft et al. | 429/33 |
| 2002/0091225 A1 | 7/2002 | McGrath et al. | 528/170 |
| 2002/0094466 A1 | 7/2002 | Kerres et al. | 429/33 |
| 2003/0032739 A1 | 2/2003 | Kerres et al. | 525/535 |
| 2004/0019143 A1 | 1/2004 | Koloski et al. | 524/434 |
| 2004/0137303 A1 | 7/2004 | Koloski et al. | 429/35 |

OTHER PUBLICATIONS

Kerres, J. et al.; "Synthesis and characterization of polyaryl blend membranes having different composition, different covalent and/or ionical cross–linking density, and their application to DMFC"; Desalination 147 (2002) 173–178.

Kim, Yu Seung et al.; "Fabrication and characterization of heteropolyacid ($H_3PW_{12}O_{40}$)/directly polymerized sulfonated poly(arylene ether sulfone) copolymer composite membranes for higher temperature fuel cell applications"; Journal of Membrane Science 212 (2003) 263–282.

Kobayashi, T. et al.; "Proton–conducting polymers derived from poly(ether–etherketone) and poly(4–phenoxybenzoyl–1,4–phenylene)"; Soldi State Ionics 106 (1998) 219–225.

Liao, Bing et al.; "Polymer–layered silicate nanocomposites. 1. A study of poly(ethylene oxide)/$Na^+$–montmorillonite nanocomposites as polyelectrolytes and polyethylene–block–poly(ethylene glycol) copolymer/$Na^+$—montmorillonite nanocomposites as fillers for reinforcement of polyethylene"; Polymer 42 (2001) 10007–10011.

Miyake, N. et al.; "Evaluation of a Sol–Gel Derived Nafion/Silica Hybrid Membrane for Polymer Electrolyte Membrane Fuel Cell Applications"; Journal of The Electrochemical Society, 148 (8) A905–A909 (2001).

Nunes, S.P. et al.; "Inorganic modification of proton conductive polymer membranes for direct methanol fuel cells"; Journal of Membrane Science 203 (2002) 215–225.

(Continued)

*Primary Examiner*—Bruce F. Bell
(74) *Attorney, Agent, or Firm*—Dechert LLP; Ben Bedi

(57) ABSTRACT

Thin films of inexpensive composite polymer electrolyte membranes containing inorganic cation exchange materials including various clay based fillers are fabricated by solution casting. The membranes exhibit higher ion exchange capacity, proton conductivity and/or lower gas crossover. In general, the composite membranes exhibit excellent physicochemical properties and superior fuel cell performance in hydrogen oxygen fuel cells.

15 Claims, 11 Drawing Sheets

OTHER PUBLICATIONS

Park, Yong–il et al.; "Proton exchange nanocomposite membranes based on 3–glycidoxypropyltrimethoxysilane, silicotungstic acid and ά–zirconium phosphate hydrate"; Solid State Ionics 145 (2001) 149–160.

Ruiz–Hitzky, Eduardo et al.; "Proton conductivity in A1–montmorillionite pillared clays"; Solid State Ionics 85 (1996) 313–317.

Shirai, Masamitsu et al.; "Photo–assisted thermal crosslinking of polymers having imino sulfonate units"; Reactive & Functional polymers 37 (1998) 147–154.

Staiti, P. et al.; "Hybrid Nafion–silica membranes doped with heteropolyacids for application in direct methanol fuel cells"; Solid State Ionics 145 (2001) 101–107.

Staiti, Pietro; "Proton conductive membranes based on silicotungstic acid/silica and polybenzimidazole"; Materials Letters 47 (2001) 241–246.

Szücs, Anna et al.; "Preparation and hydrogen sorption of Pd nanoparticles on $Al_2O_3$ pillared clays"; Colloids and Surfaces A: Physicochemical and Engineering Aspects 139 (1998) 109–118.

Tazi, B. et al.; "Parameters of PEM fuel–cells based on new membranes fabricated from Nafion silicotungstic acid and thiophene"; Electrochimica Acta 45 (2000) 4329–4339.

Tchicaya–Bouckary, L. et al.; "Hybrid Polyaryletherketone Membranes for Fuel Cell Applications"; Fuel Cells 2002, 2, No. 1, 1–6.

Tsyurupa, M.P.; "Hypercrosslinked polymers: basic principle of preparing the new class of polymeric materials"; Reactive and Functional Polymers; vol. 53; Issues 2–3; Dec. 2002; 193–203.

Xiao, Guyu et al.; "Synthesis and characterization of novel sulfonated poly(arylene ether ketone)s derived from 4,4'–sulfonyl–diphenol"; Polymer Bulletin 48, 309–315 (2002).

Yao, K.J. et al.; "Polymer/layered clay nanocomposites: 2 polyurethane nanocomposites" Polymer 43 (2002) 1017–1020.

Zaidi S.M.J., et al.; "Proton conducting composite membranes from polyether ether ketone and heteropolyacids for fuel cell applications"; Journal of Membrane Science 173 (2000) 17–34.

Deng, Q. et aol.; "Nafion®/SiO2, ORMOSIL, and Dimethylsiloxane) Hybrids Via In Situ Sol–Gel Reactions; Characterization of Fundamental Properties"; Journal of Applied Polymer Science, vol. 68, 747–763 (1998), no month available.

Easton, E.B.; "Characteristics of Pplypyrrole/Nafion composite Membranes in a Direct Methanol Fuel Cell"; Journal of The Electrochemical Society, 150 (10) C735–C739 (2003), no month available.

Fujinami, T. et al.; "Proton conducting borosiloxane–poly(ether–sulfone) composite electrolyte"; Electrochimica Acta xxx (2004) xxx–xxx, no month available.

Jung, D.H. et al., "Performance evaluation of a Nafion/silicon oxide hybrid membrane for direct methanol fuel cell"; Journal of Power Sources 106 (2002) 173–177, no month available.

Kim, D. et al. "Nano–silica layered composite membranes prepared by PECVD for direct methanol fuel cells"; Electrochemistry Communications 6 (2004) 1069–1074, no month available.

Kim, Young–Taek et al.; "Nafion/ZrSPP composite membrane for high temperature operation of PEMFCs"; Electrochimica Acta xxx (2004) xxx–xxx, no month available.

Kim, Y.M. et al.; "Organic–inorganic composite membranes as addition of SiO2 for high temperature–operation in polymer electrolyte membrane fuel cells (PEMFCs)"; Electrochimica Acta 49 (2004) 4787–4796, no month available.

Kumar, B. et al.; "Polymer–ceramic composite protonic conductors"; Journal of Power Sources 123 (2003) 132–136, no month available.

Kwak, Sang–Hee et al.; "Polymer composite membrane incorporated with a hygroscopic material for high–temperature PEMFC"; Electrochimica Acta xxx (2004) xxx–xxx, no month available.

Mauritz, K.A.; "Organic–inorganic hybrid materials; perfluorinated ionomers as sol–gel polymerization templates for inorganic alkoxides"; Materials Science and Engineering C 6 (1998) 121–133, no month available.

Nakajima, H. et al.; "High Temperature Proton Conducting Organic/Inorganic Nanohybrids for Polymer Electrolyte Membrane"; Jo8rnal of The Electrochemical Society, 149, (8) A953–A959 (2002), no month available.

Nakamoto, N. et al.; "Medium temperature operation of fuel cells using thermally stable proton–conducting composite sheets composed of phosphosilicate gel and polymide"; Journal of Power Sources xxx (2004) xxx–xxx, no month available.

Park, Y.S.; "High proton–conducting Nafion/calcium hydroxyphosphate composite membranes for fuel cells"; Electrochimica Acta xxx (2004) xxx–xxx, no month available.

Ramini, V. et al.; "Investigation of Nafion®HPA composite membranes for high temperature/low relative humidity PEMFC operation"; Journal of Membrane Science 232 (2004) 31–44, no month available.

Ramini, V. et al.; "Stabilized heteropolyacid/Nafion® composite membranes for elevated temperature/low relative humidity PEFC operation"; Electrochimica Acta xxx (2004) xxx–xxx, no month available.

Savadogo, O.; "Emerging membranes for electrochemical systems Part II. High temperature composite membranes for polymer electrolyte fuel cell (PEFC) applications"; Journal of Power Sources 127 (2004) 135–161, no month available.

Shao, Zhi–Gang et al.; "Preparation and characterization of hybrid Nafion–silica membrane doped with phosphotungstic acid for high temperature operation of proton exchange membrane fuel cells"; Journal of Membrane Science 229 (2004) 43–51, no month available.

Shim, J. et al.; "Characteristics of the Nafion ionomer–impregnated composite membrane for polymer electrolyte fuel cells"; Journal of Power Sources 109 (2002) 412–417, no month available.

Si, Y. et al.; "Nafion–Teflon–Zr($HPO_4)_2$ Composite Membranes for High–Temperature PEMFCs"; Journal of The Electrochemical Society 151 (4) A623–A631 (2004), no month available.

Vernon, D.R. et al.; "Synthesis, characterization, and conductivity measurements of hybrid membranes containing a mono–lacunary heteropolyacid for PEM fuel cell applications"; Journal of Power Sources xxx (2004) xxx–xxx, no month available.

Yang, C. et al.; "A comparison of physical properties and fuel cell performance of Nafion and zirconium phosphate/Nafion composite membranes"; Journal of Membrane Science 237 (2004) 145–161, no month available.

Young, S.K. et al.; "Nafion®/Organically Modified Silicate) Nanocomposites via Pplymer in situ Sol–Gel Reactions; Mechanical Tensile Properties"; Journal of Polymer Science: Part B; Polymer Physics, vol. 40, 2237–2247 (2002), no month available.

Adjemian, K.T. et al.; "Silicon Oxide Nafion Composite Membranes for Proton–Exchange Membrane Fuel Cell Operation at 80–140° C", Journal of the Electrochemical Society, 149 (3) A256–A261 (2002).

Aranda, Pilar et al.; "Poly(ethylene oxide)/$NH_4^+$–smectite nanocomposites", Applied Clay Science 15 (1999) 119–135.

Chen, Hsien–Wei et al.; "The novel polymer electrolyte nanocomposite composed of poly(ethylene oxide), lithium triflate and mineral clay"; Polymer 42 (2001) 9763–9769.

Costamagna, P. et al., "Nafion 115/zirconium phosphate composite membranes for operation of PEMFCs above 100° C"; Electrochimica Acta 47 (2002) 1023–1033.

Costamagna, Paola et al.; "Quantum jumps in the PEMFC science and technology from the 1960s to the year 2000, Part I. Fundamental scientific aspects"; Journal of Power Sources 102 (2001) 242–252.

Costamagna, Paola et al.; "Quantum jumps in the PEMFC science and technology from the 1960s to the year 2000, Part II. Engineering, technology development and application aspects"; Journal of Power Sources 102 (2001) 253–269.

Jung, Doo Hwan et al.; "A performance evaluation of direct methanol fuel cell using impregnated tetraethyl–orthosilicate in cross–linked polymer membrane"; International Journal of Hydrogen Energy 26 (2001) 1263–1269.

Kaur, S. et al.;"Cross–linking of sulfonated styrene–ethylene/butylene–styrene triblock polymer via sulfonamide linkages"; Polymer 43 (2002) 5163–5167.

Kerres, J. et al.; "Application of Different Types of Polyaryl–Blend–Membranes in DMFC"; Journal of New Materials for Electrochemical Systems 5, 97–107 (2002).

Adjemian, K.T. et al.; "Silicon Oxide Nafion Composite Membranes for Proton–Exchange Membrane Fuel Cell Operation at 80–140° C"; Journal of The Electrochemical Society, 149 (3) A256–A261 (2002), no month available.

Antonucci, P.L. et al.; "Investigation of a direct methanol fuel cell based on a composite Nafion®–silica electrolyte for high temperature operation"; Solid State Ionics 125 (1999) 431–437, no month available.

Ahn, Sang–Yeoul et al.; "Properties of the reinforced composite membranes formed by melt soluble ion conducting polymer resins for PEMFCs"; Electrochimica Acta xxx (2004) xxx, no month available.

Arico, A.S. et al.; "Surface Properties of inorganic fillers for application in composite membranes–direct methanol fuel cells"; Journal of Power Sources 128 (2004) 113–118, no month available.

Boysen, S.A. et al.; "Polymer Solid Acid Composite Membranes for Fuel–Cell Applications"; Journal of The Electrochemical Society, 147 (10) 3610–3613 (2000), no month available.

Chang, Jae–Hyuk et al.; "Proton–conducting composite membranes derived from sulfonated hydrocarbon and inorganic materials"; Journal of Power Sources 124 (2003) 18–25, no month available.

Chen, Sheng–Li et al.; "Ion exchange resin/polystyrene sulfonate composite membranes for PEM fuel cells"; Journal of Membrane Science xxx (2004) xxx–xxx, no month available.

Denq, Q. et al.; "Nafion/ORMOSIL Hybrids via in Situ Sol–Gel Reactions. 3. Pyrene Fluorescence Probe Investigation of Nanoscale Environment"; *Chem. Matter.* (1997), 9, 36–44, no month available.

Zoppi, R.A. et al.; "Electrochemical impedance studies of hybrids of perfluorosulfonic acid ionomer and silicon oxide by sol–gel reaction from solution"; Journal of Electroanalytical Chemistry 445 (1998) 39–45.

Zoppi, R.A. et al.; "Hybrids of perfluorosulfonic acid ionomer and silicon oxide by sol–gel reaction from solution: Morphology and thermal analysis"; *Polymer* vol. 39 Nos. 6–7, pp. 1309–1315 (1997).

* cited by examiner

COMPOSITE POLYMER ELECTROLYTES FOR PROTON EXCHANGE MEMBRANE FUEL CELLS

CROSS REFERENCE TO EARLIER APPLICATION

This application is a continuation-in-part of U.S. patent application Ser. No. 10/219,083 filed Aug. 13, 2002 now U.S. Pat. No. 6,630,265, by Taft et al. with the title "Composite Electrolyte For Fuel Cells."

This invention was made with Government support under Contract No. 0128641 awarded by the National Science Foundation to Hoku Scientific, Inc. The Government may have certain rights to the invention.

FIELD OF THE INVENTION

The present invention relates to proton conducting composite polymer membranes providing one or more of the following: a functionalized polymer and one or more clay based cation exchange materials. The composite polymer membranes can be used as proton conducting electrolytes in hydrogen oxygen fuel cells, proton exchange fuel cells (PEMFC) or direct methanol fuel cells (DMFC). These composite polymer membranes exhibit improvement in ion exchange capacity (IEC), proton conductivity, water uptake, oxidative resistance, thermal stability and mechanical strength.

BACKGROUND OF THE INVENTION

There is a commercial trend to develop alternative energy resources that are more durable and cheaper than current mainstream technologies. This movement is important in light of the increasing demand for energy and the gradual depletion of global fossil fuels. Fuel cells have been long considered a promising solution for the production of clean and efficient energy.

The electrochemical conversion that takes place in fuel cells is not limited by the Carnot efficiency which restricts the efficiencies of internal combustion engines (ICE). A fuel cell is two to three times more efficient at converting fuel to power than ICEs. Compared to batteries, fuel cells offer the advantage of continuous power as long as the reactant fuel and oxidant are supplied. This eliminates the time consuming recharging procedure.

Furthermore, fuel cells are environmentally friendly. As fuel, such as hydrogen, is fed into the anode compartment, a metal catalyst oxidizes the hydrogen gas into protons and electrons. The only emission when hydrogen is used as the fuel is water. In fuel cells, the electrode assemblies of both the anode and the cathode contain a metal catalyst (e.g., platinum) supported by a conductive material. Some PEM fuel cells use a diffusion layer on both electrodes to help distribute gases evenly across the electrode surfaces. Fuel cells use an electrolyte between the cathode and the anode. Fuel cells that employ proton conducting electrolyte membranes are referred to as "proton exchange membrane fuel cells" (PEMFC). Reactions take place where the electrolyte, gas, and an electrode are in contact with one another (multiphase boundary). The protons are transferred through the electrolyte material to the cathode, while the electrons are conducted through an external circuit (from the anode) to the cathode via an electrically conductive material. At the cathode an oxidant, such as oxygen, diffuses through the electrode where it reacts with the electrons and protons to form water. The operation of PEM fuel cells produces electricity, water, and heat.

In addition to using hydrogen, or materials that reform to hydrogen, PEM fuel cells can also operate directly with fuels such as methanol. In this case, methanol is introduced directly into the anode compartment and is internally reformed. These types of fuel cells are called direct methanol fuel cells (DMFC).

Among the various types of fuel cell technologies, PEMFC and DMFC are the preferred power sources for residential, portable, and transport applications because of their relatively lower operation temperature and quick start up times. Both PEMFCs and DMFCs use a proton conducting membrane as the electrolyte and composite electrode assemblies consisting of platinum based electrocatalysts and carbon. The main difference between PEMFCs and DMFCs is the type of fuel each of them use and their emissions. While PEMFCs use gaseous hydrogen as fuel and emit only water, DMFCs use methanol as fuel and emit water and carbon dioxide.

One of the most significant components of PEMFCs and DMFCs is the proton exchange membrane (PEM). As previously noted, the proton exchange membrane acts as an ionic conductor between anode and cathode and separates the fuel and oxidant. Several polymer electrolyte membranes are being explored as proton exchange membranes in PEM fuel cells. Presently, both PEMFC and DMFC use expensive hydrated perfluorosulfonic acid based membranes as the electrolyte because of their excellent chemical, mechanical and thermal stability and relatively high proton conductivity of around 0.08 $Scm^{-1}$ in the hydrated state.

The leading commercial perfluorosulfonic acid based membrane is Nafion® (Nafion® is a trademark of E. I. DU PONT DE NEMOURS and Company Corporation, Delaware). Nafion®, which is described, for example, in U.S. Pat. No. 4,330,654 is fabricated by melting tetrafluoroethylene and perfluorovinyl ethersulfonyl fluoride together, shaping the mixture, and then hydrolyzing the melt to yield the ionic sulfonate form.

While perfluoronated ionomer membranes, such as Nafion® membranes, are effective in PEM fuel cells they have limitations. Among these limitations are reduced proton conductivity at elevated temperatures (>80° C.), high osmotic expansion, limited maximum operating temperature (<100° C.), high methanol permeability, and high cost.

Nafion® has inherent water management difficulties when operating above 80° C. resulting in decreased proton conductivity. These membranes need to be adequately humidified to provide satisfactory proton conductivity. This is due to the hydrophilic nature of the sulfonic acid groups attached to the polymer backbone and the necessity to hydrate the ionic clusters. However, when the membrane temperature exceeds the boiling point of water, the membrane dehydrates and experiences a dramatic decrease in the proton conductivity. Consequently, perfluoronated ionomer membranes are not regarded as suitable for fuel cell applications above 100° C. Conversely, operation of PEMFCs at elevated temperatures (T>100° C.) can provide several significant advantages. For example, the higher operating temperature can provide faster reaction kinetics, better efficiencies, reduce or eliminate Pt-based catalyst poisoning by carbon monoxide impurity in the fuel, and possibly allow the use of less expensive non-platinum alloy or transition metal oxide catalysts.

Several strategies have been employed to increase the operating temperature of Nafion® and Nafion® like membranes. Many have tried sol-gel or other processes to infiltrate the porous structure of Nafion® with components that will increase its performance at elevated temperatures. Staiti et al and Tazi et al impregnated Nafion® with phosphotungstic acid and silicotungstic acid/thiophene, respectively, which increased proton conductivity and hydration levels at temperatures up to 120° C. (See, P. Staiti, "Proton Conductive Membranes Based on Silicotungstic Acid/Silica and Polybenzimidazole", *Materials Letters*, 47 (2001) 241–246, and B. Tazi et al, "Parameters of PEM Fuel Cells Based on New Membranes Fabricated From Nafion®, Silicotungstic Acid and Thiophene", *Electrochimica Acta*, 45 (2000) 4329–4339). Others including P. Costamagna et al and Park et al demonstrated that Nafion® doped with zirconium hydrogen phosphate provided similar results. (See, P. Costamagna et al, "Nafion® 115/Zirconium Phosphate Composite Membranes for Operation of PEMFCs Above 100° C., *Electrochimica Acta*, 47, 2002, 1023–1033 and Y. Park et al, "Proton Exchange Nanocomposite Membranes Based on 3-Glycidoxypropyltrimethoxysilane, Silicotungstic Acid and Zirconium Phosphate Hydrate", *Solid State Ionics*, 145, 2001, 149–160). However, by using Nafion® as the base material, these membranes are still very expensive. In addition, some of these additives leach out of the membrane structure during fuel cell operations, which limits their utility.

When used in DMFCs, high methanol permeability is another significant deficiency exhibited by perfluoronated ionomer membranes (e.g., Nafion® like membranes). Methanol crossover is much more prevalent than hydrogen crossover, especially at concentrations above 10 wt %. This is primarily a result of the liquid concentration gradient. To minimize crossover, some researchers have incorporated additives into Nafion® or vaporized methanol before introducing it to the anode compartment. This solution, however, does not address Nafion's® expensive cost or inherent disposition to methanol crossover.

One of the other major drawbacks of perflouronated membranes such as Nafion® is its high cost. Due to its relatively complicated and time-consuming manufacturing process, Nafion® is expensive ($700 per square meter at the time of this writing). Typically, Nafion® membranes represent 10–15% of the total cost of a single PEM fuel cell or stack of fuel cells. It is generally accepted that if Nafion® we re to continue to represent the leading membrane candidate for PEM fuel cells, its cost must come down substantially before these cells can become competitive in the fuel cell market.

A variety of alternative membranes have been considered for solving the technical limitations of Nafion® in PEM fuel cells, but none of these alternatives has demonstrated sufficient advantages to replace Nafion® as the membrane of choice. One alternative membrane incorporates Nafion® or a Nafion®-like polymer into a porous polytetrafluoroethylene (Teflon®) structure. These membranes are available under the trade name Gore-Select® from W. L. Gore & Associates, Inc. and they are described in U.S. Pat. Nos. 5,635,041, 5,547,551 and 5,599,614. Other alternative membranes are available under the trade names Aciplex® from Asahi Chemical Co. and Flemion® from Asahi Glass. Due to their polyfluoronated structures, these alternative membranes exhibit many of the same deficiencies as Nafion®, namely, limited ionic conductivity at elevated temperatures, dehydration or drying up, and fuel crossover.

Composite ion exchange membranes with a low expansion, durable polymer impregnated with a high proton conductive polymer described, for example, in U.S. Pat. No. 6,248,469 represent another alternative. The main disadvantage of such membranes is that they loose some of the cross sectional area of the proton conductive material due to the presence of the inactive support.

Another alternative to Nafion® membrane employs polybenzimidazole polymers (PBI) that are infiltrated with phosphoric acid. These have been used as ion exchange membranes in PEM fuel cells and are described in U.S. Pat. Nos. 5,716,727 and 6,099,988. These membranes permit PEM fuel cells to operate at higher temperatures above 130° C., and exhibit lower osmotic expansion than Nafion®. However, the concentrated acid leaches out from the PBI pores as water is produced during the electrochemical fuel cell process, thereby dramatically reducing the proton conductivity and electrochemical performance with time. The leached phosphoric acid may also react with other components in the fuel cell stack.

Finally, more recent research has led to unique formulations and designs of ion exchange membranes. For example, Chen et al showed that incorporation of montmorillonite and lithium triflate into poly(ethylene oxide) (PEO) enhanced the ionic conductivity of the electrolyte by nearly 16 times compared to unmodified PEO. See Chen et al, "The Novel Polymer Electrolyte Nanocomposite Composed of poly(ethylene oxide), lithium triflate and mineral clay", *Polymer*, 42 (2001) 9763–9769. However, the increased proton conductivity values in these fuel cells were still substantially lower than those produced by fuel cells using Nafion®. Similarly, Aranda et al created a membrane by combining poly(ethylene oxide) and ammonium exchanged montmorillonite, but the membrane also exhibited low ion conductivity.

Based on the foregoing, there is a demonstrated need to develop inexpensive and higher performing alternatives to existing proton exchange membranes. Additionally, there is a need for a more cost effective membrane fabrication method.

SUMMARY OF THE INVENTION

The present invention is based, in part, on the discovery of composite electrolyte membranes that can be used as proton exchange membranes in PEM fuel cells, and the processes for producing these membranes.

One aspect of the invention is directed to a composite electrolyte for use in an electrochemical fuel cell that includes: (i) an inorganic cation exchange material; (ii) a silica-based material; and (iii) a proton conducting polymer-based material. The inorganic cation exchange material comprises about 0.1 wt % to about 99 wt %, the silica-based material comprises about 0 wt % to about 70 wt %, and the proton conducting polymer-based material comprises about 0.1 wt % to 99.9 wt % of the composite electrolyte.

Preferred cation exchange materials include clays, zeolites, hydrous oxides, and inorganic salts. For example, the clay includes an aluminosilicate-based exchange material selected from the group consisting of montmorillonite, kaolinite, vermiculite, smectite, hectorite, mica, bentonite, nontronite, beidellite, volkonskoite, saponite, magadite, kenyaite, zeolite, alumina, and rutile. The clay can be modified to make it more compatible with organic matrices, wherein a clay modification includes exfoliation which helps to separate platelets of inorganic substance. Another aspect of the invention is directed to an electrochemical fuel cell that includes: (i) an anode; (ii) a cathode; (iii) fuel supply means for supplying fuel toward the anode; (iv) an oxidant supply means for supplying oxidant toward the cathode; and (v) a composite electrolyte positioned between the anode and cathode. The composite electrolyte includes (a) an inorganic cation material, (b) a silica-based material, and (c) a polymer-based material, wherein the inorganic cation exchange material comprises about 0.1 wt % to about 99 wt %, the silica-based material comprises about 0 wt % to about 70 wt %, and the proton conducting polymer-based material comprises about 0.1 wt % to 99.9 wt % of the composite electrolyte.

Yet another aspect of the invention is directed to a method of fabricating a composite electrolyte for use in an electrochemical fuel cell. The method includes (i) applying onto a surface of a substrate a viscous liquid composition of (a) an inorganic cation exchange material, (b) silica-based material, (c) a polymer-based material, and (d) a solvent-dispersant. The method further includes (i) spreading the viscous liquid composition to form a uniform thickness layer on the substrate; and (ii) allowing the solvent to evaporate from the viscous liquid composition to yield the composite electrolyte. The inorganic cation exchange material comprises about 0.1 wt % to about 99 wt %, the silica-based material comprises about 0.1 wt % to about 70 wt %, and the polymer-based material comprises about 0.1 wt % to 99.9 wt % of the composite electrolyte.

BRIEF DESCRIPTION OF THE DRAWINGS

The accompanying drawings which, are incorporated in and constitute a part of this specification, illustrate several embodiments of the invention and together with the description, serve to explain the principles of the invention. Wherever convenient, the same reference numbers will be used throughout the drawings to refer to the same or like elements.

DETAILED DESCRIPTION OF THE INVENTION

The present invention provides a low cost, composite membrane and a cost effective method for fabricating such membranes. A composite membrane produced in accordance with the present invention exhibits properties comparable to Nafion® when used as an electrolyte in fuel cells. Indeed, a composite membrane provided in accordance with the present invention exhibits higher proton conductivity at elevated temperatures, greater mechanical strength, higher ion exchange capacity, and lower methanol crossover as compared to Nafion®. This composite membrane is well suited for use as a proton exchange membrane in hydrogen-oxygen fuel cells and direct methanol fuel cells.

It is noted that the composite membrane can be employed as an electrolyte in conventional fuel cells which are described, for example, in U.S. Pat. Nos. 5,248,566 and 5,5477,77. As fuel cells are modular in nature, depending on the power requirement, one can assemble them in series to make a fuel cell stack.

Figure 1:
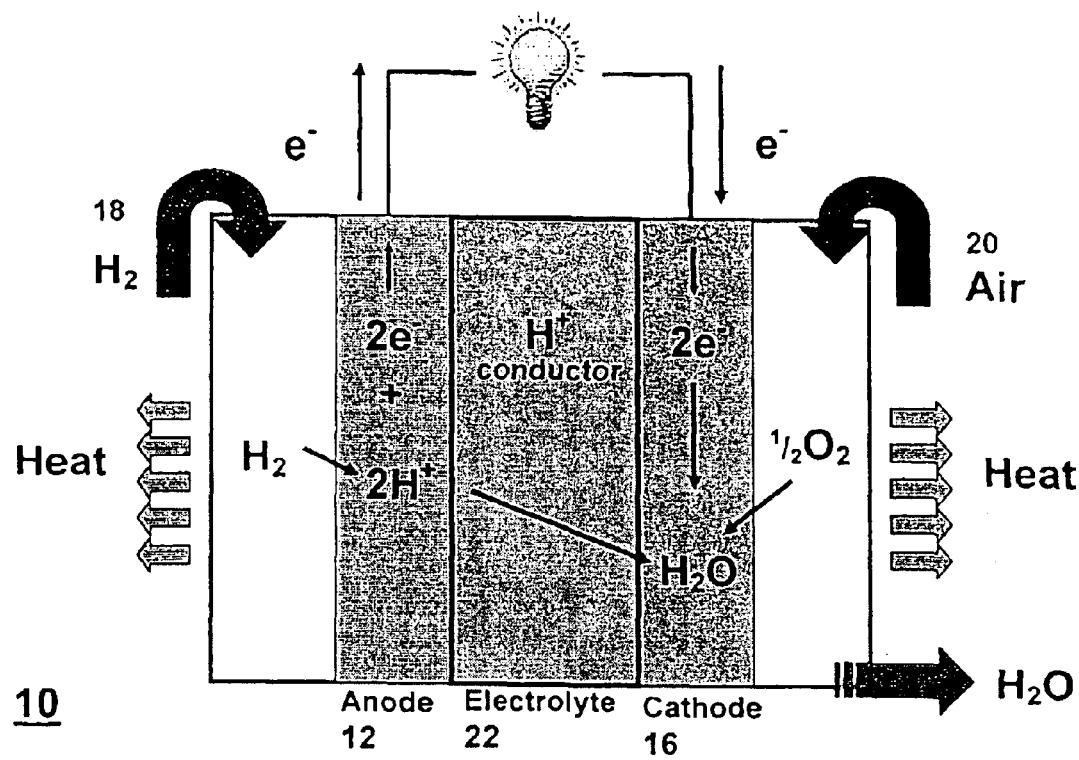
FIG. 1 illustrates operation of PEM fuel cell.

The composite membrane is particularly suited for use as the proton exchange membrane in electrochemical fuel cells such as the one illustrated in FIG. 1. The electrochemical cell 10 generally includes a membrane electrode assembly (MEA) flanked by graphite based anode 12 and cathode 16 flow field structures.

The external circuit can comprise any conventional electronic device or load such as those described in U.S. Pat. Nos. 5,248,566, 5,272,017, 5,547,777 and 6,387,556. The components, mainly the MEA assembly can be hermetically sealed by known techniques.

In operation, fuel 18 from fuel source diffuses through the anode 12 and an oxidizer 20 from oxidant source (e.g., container or ampoule) diffuses through the cathode 16 of the MEA. The chemical reactions in the MEA develop the electromotive force and the electrons are transported through an electronic load. The composite electrolyte (the composite membrane) 22 conducts ions between the anode 12 and cathode 16, separates the fuel 18 and oxidant 20 and insulates between the cathode and anode so that the electrons are conducted through the external circuit rather than the membrane. Hydrogen oxygen fuel cells use hydrogen 18 as the fuel and oxygen 20 as the oxidizer. For direct methanol fuel cells, the fuel is liquid methanol.

Figure 2:
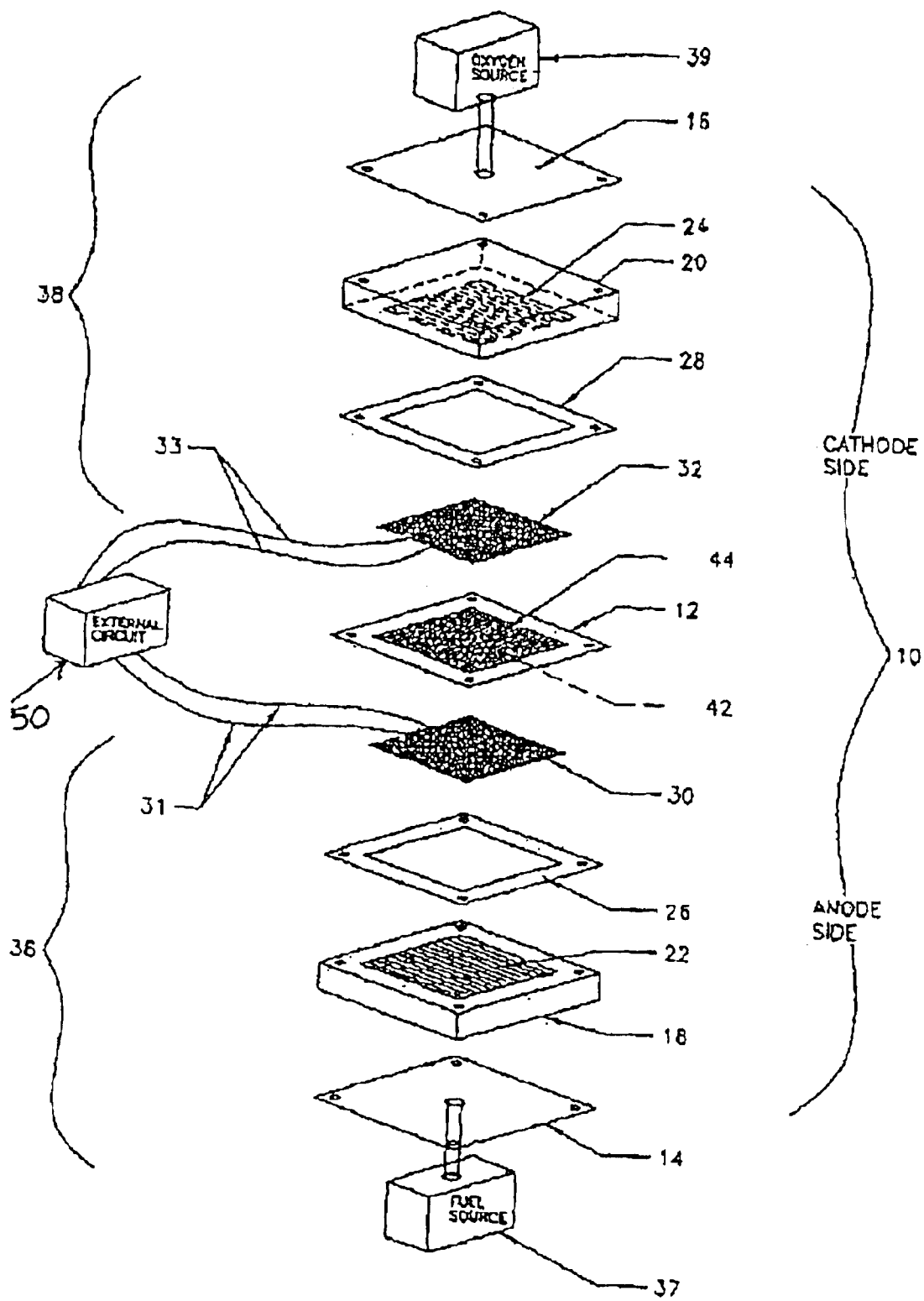
FIG. 2 is an exploded view of a PEM fuel cell.
Figure 3:
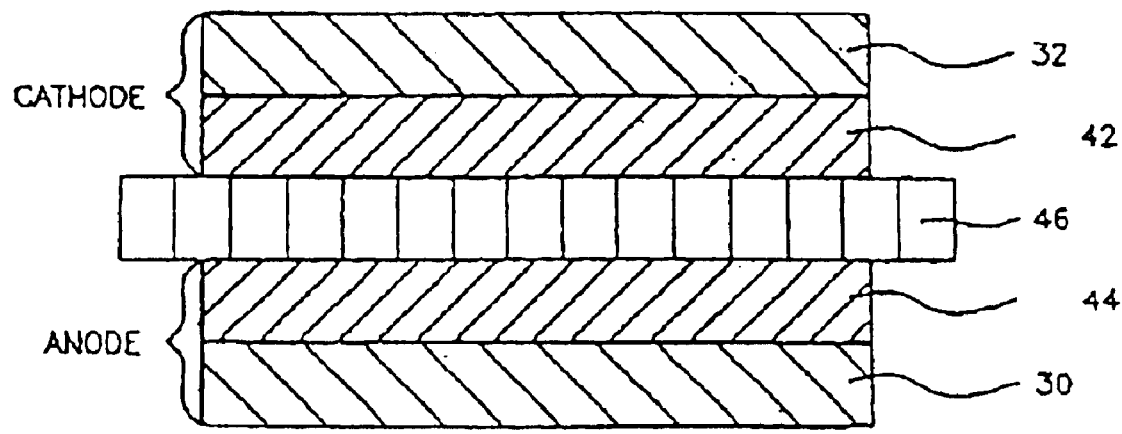
FIG. 3 shows an exemplary fuel cell with an embodiment of the composite electrolyte.

A more detailed example of a fuel cell embodying the composite electrolyte membrane is provided in FIGS. 2 and 3. As shown in FIG. 2, the fuel cell 10 includes a membrane electrode assembly 12 flanked by the anode and cathode structures, 36 and 38. On the anode side, the cell includes an endplate 14, graphite block or bipolar plate 18 with openings 22 to facilitate gas distribution, gasket 26, and anode carbon cloth current collector 30. On the cathode side, the cell includes stainless steel endplate 16, graphite block or bipolar plate 20 with openings 24 to facilitate gas distribution, gasket 28, and cathode carbon cloth current collector 32. The carbon cloth material is a porous conductive substance. The anode current collector 30 and cathode current collector 32 are connected to external circuit 50 by leads 31, 33 respectively. The external circuit can comprise any conventional electronic device or load such as those described in U.S. Pat. Nos. 5,248,566, 5,272,017, 5,547,777, and 6,387,556.

As shown in FIG. 3, the membrane electrode assembly (MEA) 12 includes a proton exchange membrane 46 that is flanked by anode 42 and cathode 44 electrodes. Each electrode is made of a porous electrode material such as carbon cloth or carbon paper. The proton exchange membrane 46, fashioned as the inventive composite electrolyte, provides for ion transport during operation of the fuel cell.

In operation, fuel from the fuel source 37 diffuses through the anode and an oxidizer from the oxidizer source 39 (e.g., container or ampoule) diffuses through the cathode. The chemical reactions at the MEA generate electricity that is transported to the external circuit (via the anode current collector 30). Hydrogen fuel cells use hydrogen as the fuel and oxygen as the oxidizer. For direct methanol fuel cells, the fuel is liquid methanol.

In accordance with the general principles of the invention, the composite electrolyte comprises: (i) an inorganic cation exchange material, (ii) a silica-based material, and (iii) a polymer-based material. The invention allows, however, any combination of these materials to be used for producing a proton exchange membrane.

The preferred inorganic cation exchange materials include clays, zeolites, hydrous oxides, and inorganic salts, which are described, for example, in Amphlett, C. B., *Inorganic Ion Exchangers*, Elsevier Publishing Co., Amsterdam, 1964, and Qureshi et al, *Inorganic Ion Exchangers in Chemical Analysis*, CRC Press, Boca Raton, 2000.

Preferred zeolites include heulandite, analcite, chabazite, phillipsite, ZK5, ZK4, mordenite, and the linde family. Preferred hydrous oxides include ferrous hydroxide, magnesium hydroxide, aluminum hydroxide, and beryllium oxide. Preferred inorganic salts include zirconium phosphate, titanium phosphate, zirconium arsenate, tin phosphate, and cerium phosphate.

Preferred clays include aluminosilicate-based exchange materials selected from the group consisting of montmorillonite, kaolinite, vermiculite, smectite, hectorite, mica, bentonite, nontronite, beidellite, volkonskoite, saponite, magadite, kenyaite, zeolite, alumina, rutile, and mixtures thereof. These clays are commercially available. For example, montmorillonite is available from Aldrich Fine Chemicals. In addition, the clays can be tailored to make them more compatible with organic matrices. Modifications include, but are not limited to exfoliation which helps to separate the platelets of inorganic substance more effectively.

Typically, the composite electrolyte is comprised of about 0.1% to about 99% inorganic cation exchange material, and preferably about 0.1% to about 30% (all percentages herein are based on weight unless otherwise noted). The inorganic cation exchange materials serve a number of functions. Foremost, these materials help increase ion exchange capacity (IEC).

Figure 4:
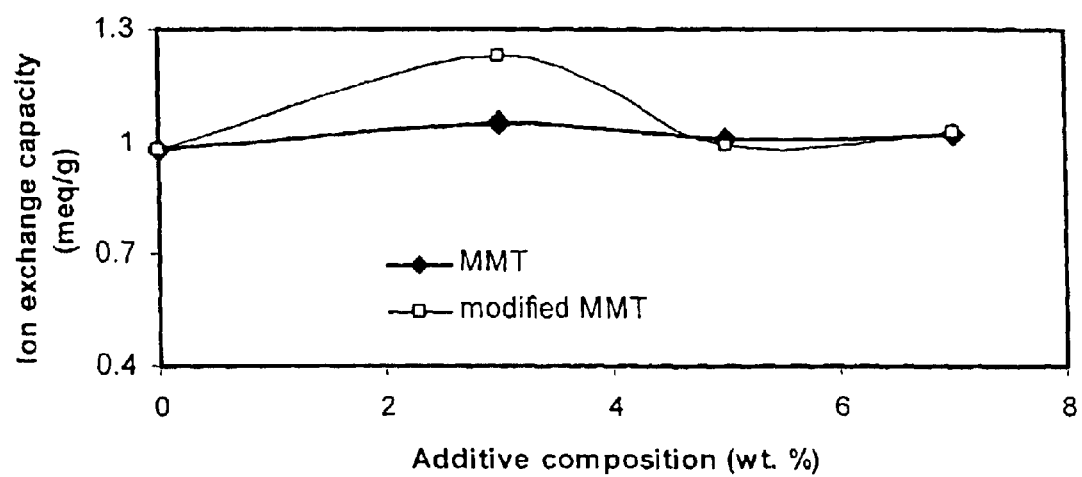
FIG. 4 is a graph comparing IEC values of the present invention.

FIG. 4 shows the IEC values for several membranes with different amounts of montmorillonite (MMT) and also with modified montmorillonite (mMMT). Montmorillonite is just one of the clay materials that may be used solely or in combination with other additives. The modified montmorillonite (Nanomer 1.24 TL, by Nanocor, Inc., Arlington Heights, Ill.) consists of montmorillonite treated with aminododecanoic acid. Other possible modifiers of inorganics include, but are not limited to, trimethyl stearate ammonium (Nanomer, 1.28E, by Nanocor, Inc., Arlington Heights, Ill.), Octadecylamine (Nanomer, 1.30 E, by Nanocor, Inc., Arlington Heights, Ill.), methyl dihydroxy hydrogenated tallow ammonium (Nanomer, 1.34 TCN, Nanocor, Inc., Arlington Heights, Ill.), etc. The layered structure of montmorillonite is created by strong electrostatic forces that hold the adjacent clay platelets together. The aspect ratios of the stacked platelet structure are far greater than that of the individual platelets which are on the order of 100–1500 nm. Nano-sized platelets may increase the modulus of the matrix without a concomitant decrease in ductility; as is generally observed when micron-sized additives are used. Therefore, the benefit of using high aspect ratio platelets can be realized only if the stacks are separated. In order to evaluate the effect of additives on the IEC, the base proton conducting polymer is identical in all the cases. One can see from FIG. 4 that as the percentage of montmorillonite is increased, IEC increases and a maximum is observed when the modified montmorillonite amount is about 3 wt. %. In comparison, the effects of montmorillonite on IEC values are better in the case of modified montmorillonite.

Figure 5:
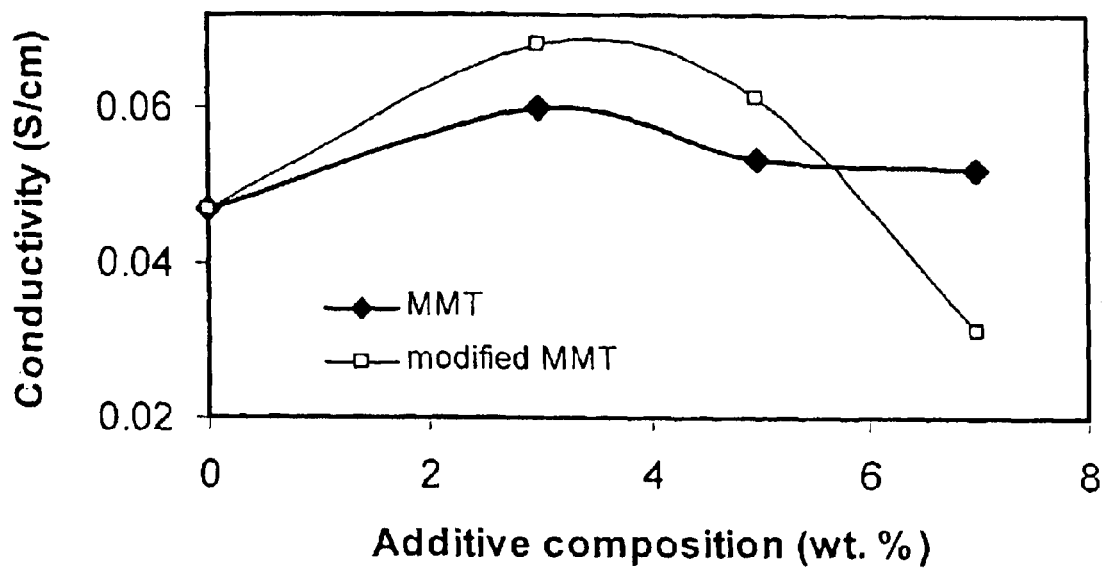
FIG. 5 is a plot of proton conductivity in saturated water vapor of the present invention.

Other attributes are affected by the introduction of additives to the composition of the polymer, including proton conductivity. FIG. 5 illustrates the empirical results of proton conductivity at a particular temperature of 90° C. for various compositions of composite polymer electrolyte membranes. The two probe conductivity method for analyzing the proton conductivity of these same membranes is similar to a method described by Mueller and Urban. See Mueller et al. "Characterization of direct methanol fuel cells by an impedance spectroscopy", *Journal of Power Sources*, 75, (1998), 139–143. Irrespective of the membrane composition, as temperature is increased, proton conductivity increases. However, the proton conductivities of the membrane formulations with a higher amount of inorganic cation exchange materials have higher conductivities at elevated temperatures. Higher conductivities at elevated temperatures are useful as it increases reaction kinetics, reduces catalyst poisoning, increases overall efficiency, and can help reduce the cost of the overall fuel cell system. Evidently, as one would expect based on the IEC values, the maximum proton conductivity value is observed in FIG. 5 for the composite polymer electrolyte membrane with 3 wt. % modified montmorillonite additive.

Figure 6:
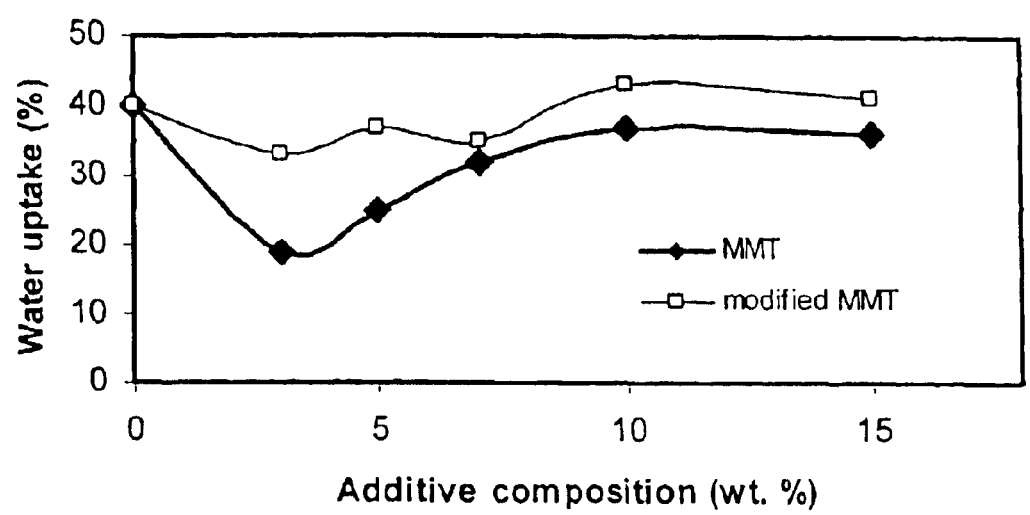
FIG. 6 is a plot of comparison of water retention characteristics of the present invention and Nafion®.

As can be further observed in FIG. 6, the addition of the inorganic material significantly reduces water swelling. In addition to reducing the water swelling of the membrane, the incorporation in the polymer of some of the inorganic materials disclosed here also improves the water retention capability of the membrane at elevated temperatures. This is critical to achieving adequate conductivities at elevated temperatures. What is significant is that the addition of montmorillonite helps the membrane to retain water at elevated temperatures with very low beating ramp. Due to its high conductivity at elevated temperatures and moisture retaining capabilities, the composite electrolyte membrane is expected to support fuel cell operations up to 120° C.

Lastly, the addition of inorganic materials such as clays in the polymer matrix tends to increase the mechanical strength of the membrane. The inorganic cation exchange materials disclosed in the present invention also tend to improve the structural integrity of the membrane, in particular, by reducing the degree of dimensional fluctuations caused by electrochemical cell temperature variations and/or variations in composite electrolyte membrane water content.

Figure 7:
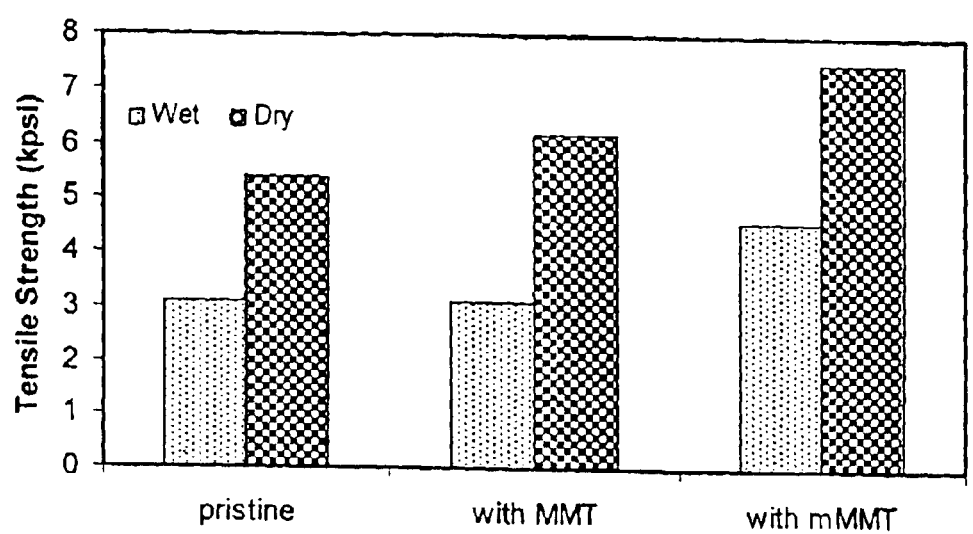
FIG. 7 is a plot of tensile strength for the present invention.
Figure 8:
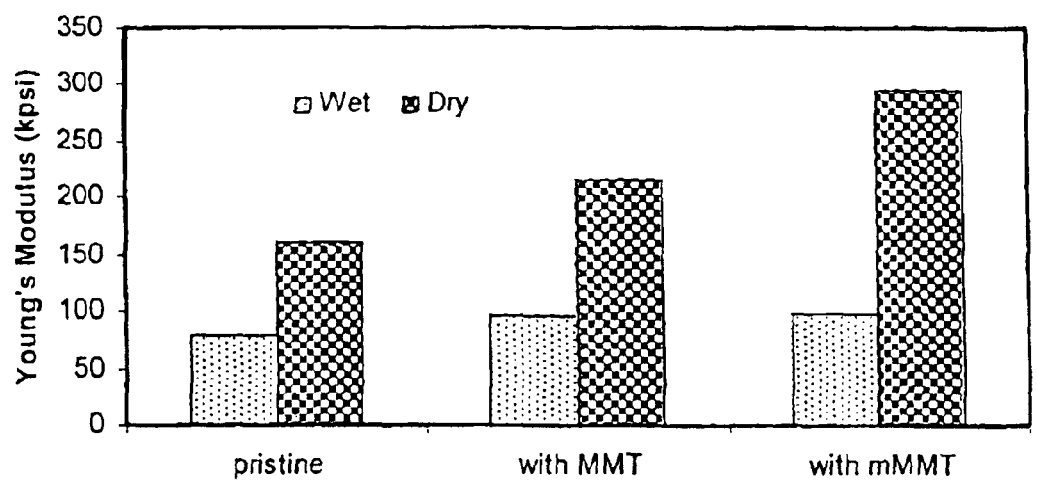
FIG. 8 is a plot of Young's modulus for the present invention.

In some cases, tensile strength more than doubles with the addition of inorganic cation exchange materials in either dry or wet conditions. For example, FIG. 7 highlights the effect of inorganic cation exchange materials on tensile strength in both wet and dry conditions. By adding 3 wt. % modified montmorillonite to the polymer matrix the dry modulus increases by approximately 10%. Moreover, the Young's modulus (FIG. 8) of the composite polymer electrolyte membrane is increased by about 20%. In general, composite polymer membranes with unmodified montmorillonite show much higher tensile strength and young's modulus as compared to the pristine polymer membranes (membranes without additives). However, the composite membranes using modified montmorillonite as an additive show even better mechanical behavior compared to the pristine and composite membranes with montmorillonite. This can be explained by the better exfoliation of the montmorillonite clay particles with high aspect ratios.

When used in the polymer matrix of a membrane structure, the silica-based material has many positive affects.

These include increasing the IEC, increasing proton conductivity, reducing the swelling of hydrophilic materials, and increasing the mechanical strength. Silica based materials increase the ion exchange capacity of the composite membrane, especially when inorganic cation exchange materials are present.

The silica-based material is comprised of materials containing silica, silicates, and/or silicates having organic groups such as silicate esters or any combinations thereof. Preferred silica-based materials include a colloidal silica comprising discrete spheres of silica that is available under the trade name LUDOX Aldrich Fine Chemicals. Another preferred silica-based material is a silica based binder known by tetraethylorthosilicate (TEOS) also from Aldrich Fine Chemicals. Typically, the composite electrolyte contains about 0.1% to about 70% and preferably from about 0.1% to about 30% of the silica-based material.

Figure 9:
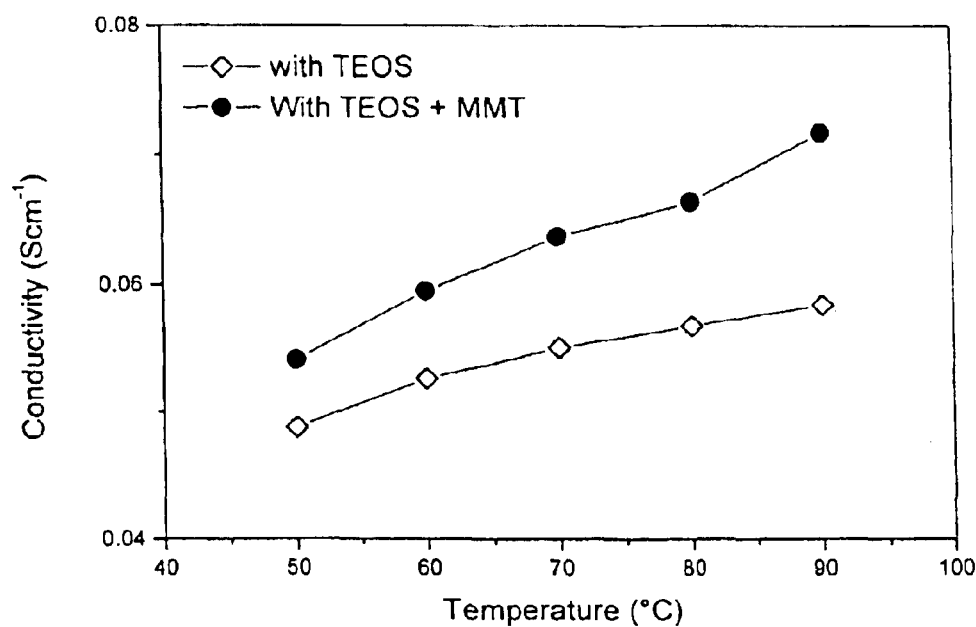
FIG. 9 is a plot comparing proton conductivity at various temperatures for the present invention.

In some cases, the addition of a silica-based material to kaolinite increases kaolinite's cation exchange capacity by 200%. However, regardless of mechanisms, the proton conductivity of the composite electrolyte membrane containing TEOS and kaolinite in the base polymer is greater than a membrane containing just kaolinite. Indeed, as shown in FIG. 9, the proton conductivity of the composite electrolyte membrane containing TEOS and clay (montmorillonite) in the polymer matrix is greater than a membrane containing just TEOS, indicating that materials such as MMT help improve membrane conductivity.

In the composite electrolyte, the polymer-based material is comprised of a polymer, or polymers that serve as the adhesive or base for the other components of the composite electrolyte. Any suitable polymer that is sufficiently chemically inert, mechanically durable, and ductile to withstand the operation conditions of electrochemical devices, particularly those of PEM fuel cells, can be employed. The general polymer structure may be linear, branched, or a network or a combination thereof. It may contain aryl structures as well as inorganic moieties. Preferred polymer materials include acrylonitrile/butadiene/stryene rubber (ABS), styrene butadiene/acrylate/acetate polymer blends, epoxides, and thermoplastics, or mixtures thereof. Preferred thermoplastics include, but are not limited to, polypropylene, polycarbonate, polystyrene, polyethylene, polyaryl ether sulfones, poly aryl ether ketone, and polysulfones. Particularly, preferred polymers have functional groups such as, sulfonate, phosphate, carbonate, amide, or imide groups, which have inherent proton conducting capabilities. Thus, the polymer-based material, increases the mechanical strength of the composite electrolyte membrane, and increases the proton conductivity during electrochemical cell operation. Typically, the composite electrolyte is comprised of about 0.1% to about 99.9% and preferably from about 40% to about 99.9% polymer-based material. The composite electrolyte does not require perfluoronated polymers such as Nafion® or its derivatives.

The composite electrolyte can further include additives such as preservatives, thixotropy and viscosity control agents, crosslinking agents, conditioners, plasticizers, water control agents, proton conducting materials and other enhancing components commonly known in the art. However, the dried composite electrolyte membrane consists essentially of three primary components, namely: (i) an inorganic cation exchange material, (ii) a silica-based material, and (iii) a polymer-based material. Indeed, in preferred embodiments, the three primary components make up at least 90% of the solids of the composite electrolyte.

Figure 10:
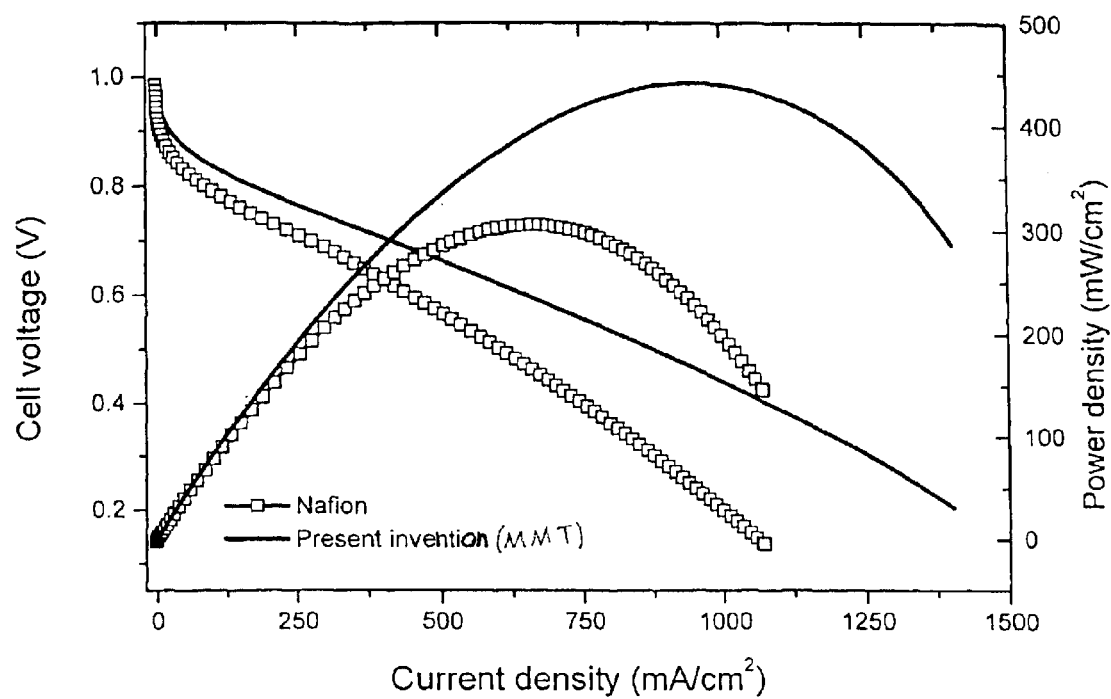
FIG. 10 is a plot comparing cell output performance for Nafion® membrane and a membrane constructed in accordance with principles of the present invention.

FIG. 10 highlights the performance of an exemplary fuel cell with a particular composite membrane embodiment. It can be observed that the composite membrane with montmorillonite in accordance with the present invention performs better than Nafion® (current density and power density) under identical operating conditions. It is noted that although this example compares the cell output performance for the two types of membranes, i.e., the particular embodiment of composite electrolyte and Nafion®, it does not represent the best performance that can be achieved by fuel cells embodying composite electrolytes in according with the present. Overall, the composite electrolyte preferably has a proton conductivity on the order of 0.005 S/cm and more preferably of at least 0.05 S/cm below 100° C. This will enable the rapid proton transfer from anode to cathode when the composite electrolyte is used as a proton exchange membrane in a fuel cell.

Figure 11:
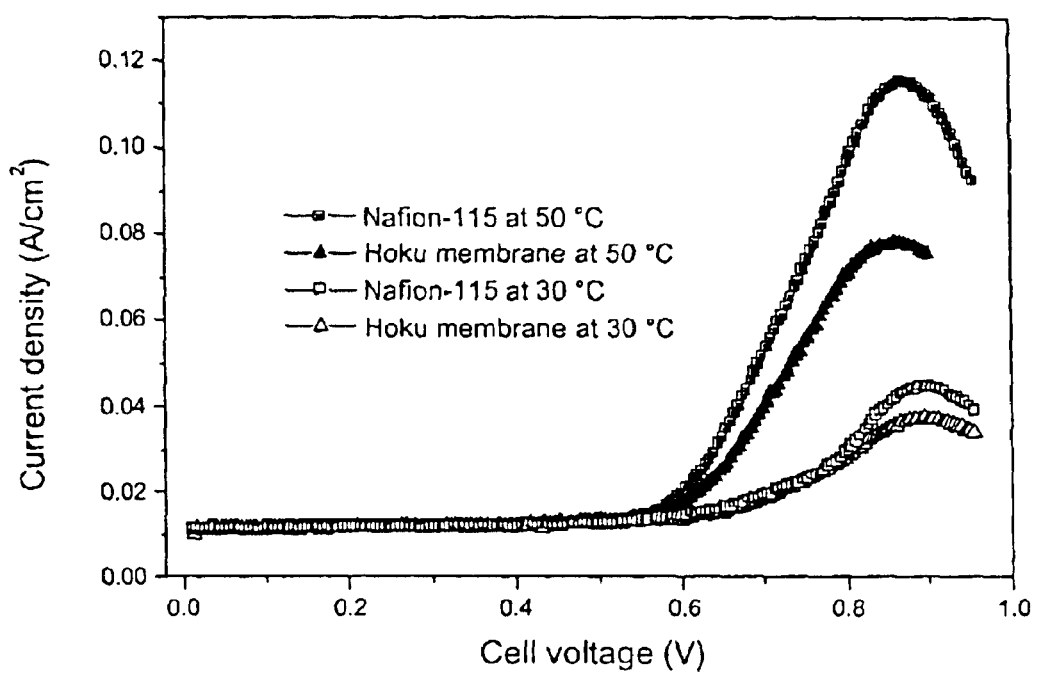
FIG. 11 is a plot comparing methanol crossover current density for Nafion® membrane and a membrane constructed in accordance with principles of the present invention at 30 and 50° C. using 10% methanol.

FIG. 11 highlights the present invention's methanol crossover currents compared to those of Nafion® at room temperature as well at 50° C. using 10% methanol in water at the anode and humidified nitrogen at the cathode. It is observed that the present invention using TEOS and MMT as additives has a significantly lower current density crossover compared to Nafion®-115 membranes. This could be due to the structural morphology of the current invention membranes where the tortuousity for the methanol permeation is higher compared to Nafion. The present invention's numbers would be more significant if normalized for thickness. As shown the invention has a 60 micron thickness compared to more than 120 microns for Nafion® sample.

As compared with conventional membranes, the various attributes of a composite electrolyte in accordance with the present invention provide for better manufacturing results. For example, the composite membrane tends to be more physically robust to adequately withstand MEA manufacturing processes and pressure differentials within a fuel cell stack. Furthermore, the membrane tends to have a higher water retaining potential. This will enable higher temperature operation without sacrificing proton conductivity. Finally, the membrane tends to be more chemically robust so as not to degrade in the stack environment.

In manufacturing, the composite membranes of the present invention can be fabricated by thoroughly mixing the membrane components in a solvent to minimize agglomeration. Depending on the polymer, water can be used as the solvent; raising the pH of the water on occasion helps to stabilize the particles in the slurry and facilitate mixing. Furthermore, other solvents such as, but not limited to, N-methylpyrrolidinone, dimethyl sulfoxide, dimethyl acidimide, and dimethylformamide may be used. The viscous solution is poured over a substrate and leveled to a uniform thickness. After evaporation of the solvent and removal from the substrate, the membrane is cut to size and is ready for use. Applying heat or reducing the pressure can be applied to facilitate evaporation. A preferred technique is a tape casting method whereby the slurry of components is poured onto a silicon coated polyester (MYLAR) sheet. A doctor blade moving across the slurry adjusts the height to the desired thickness ranging from about 0.5 $\mu$m to about 500 $\mu$m and preferably from about 100 $\mu$m to about 300 $\mu$m. Evaporation of the solvent takes place in a controlled temperature and humidity environment. Other methods of membrane assembly include extrusion and tray casting.

EXAMPLES

The following describes composite membrane formulations and testing as a proton exchange membrane. The description, although not exhaustive, serves to familiarize the reader with composite membrane production methods in accordance with the principles of the present invention. Any of the previously disclosed inorganic cation exchange materials, silica-based materials, and proton conducting polymer-based materials may be incorporated into the invention.

Before testing, as part of a production method, the formulation involves adding a montmorillonite or modified montmorillonite (1.24 TL, Nanomer, IL, USA) to different samples of sulfonated polyether ether ketone (SPEEK) to create membranes with 0, 3, 5, 7, 10 and 15 wt % loading of clay. SPEEK and clay mixtures were grounded to disperse the clay uniformly and aid in dissolution. Following grinding, the mixture of SPEEK and clay were dissolved in approximately 10 ml distilled N,N-dimethylformamide (DMF) by stirring for about 2 hours using a magnetic stir bar. Subsequently, the solution of DMF containing dissolved SPEEK and clay were sonicated for about 4 minutes using an Ultrasonic Homogenizer. The sonicated solution was stirred and heated to allow the solvent (DMF) to evaporate. Heating and stirring continued until the solution thickened and attained a casting consistency. The polymer and/or composite polymer solution may be prepared by using any of the solvents not limited to N,N-dimethylformamide, N,N-dimethyl acetamide, N-methyl-2-pyrrolidinone, dimethyl sulfoxide alcohols such as isopropyl alcohol, and t-butyl alcohol. Next, the solution was degassed in a vacuum oven. After vacuum treatment, the resulting solution was poured out onto a clean glass plate and cast into approximately 50 µm thick films using a doctor blade. The curing protocol proceeds as follows: first, the cast film is annealed in a convection oven for about 12 hours at about 70° C.; next, the cast film is placed in a vacuum oven for about 12 hours at about 100° C.; after which it is subjected to vacuum for approximately 12 hours in an oven which is maintained at about 130° C. Then, the cured films are peeled off the glass plate using a blade and protonated. The films are stored in ultra-pure water until ready for use.

In testing, proton exchange membranes produced by the foregoing method showed improved mechanical properties, water uptake, and conductivity over unmodified SPEEK of the same sulfonation level. Furthermore, these membranes displayed higher conductivities and lower methanol crossover values than those of Nafion®, making them well suited for use as proton exchange membranes in hydrogen oxygen fuel cells and DM fuel cells.

In summary, the discovery of composite polymer membranes and of the process of producing such membranes promotes the use of fuel cells as a viable alternative to existing energy sources. Composite polymer electrolyte membranes, particularly those with additives such as montmorillonite, exhibit better physiochemical properties and thus provide superior fuel cell performance.

What is claimed is:

1. A method of fabricating a composite electrolyte for use in an electrochemical fuel cell, comprising:
   (i) applying onto a surface of a substrate a viscous liquid composition of (a) an inorganic cation exchange material, (b) silica-based material, (c) a polymer-based material, and (d) a solvent-dispersant;
   (ii) spreading the viscous liquid composition to form a uniform thickness layer on the substrate; and
   (iii) allowing the solvent to evaporate from the viscous liquid composition to yield the composite electrolyte, wherein the inorganic cation exchange material comprises about 0.1 wt % to about 99 wt % of the composite electrolyte.

2. The method of claim 1, wherein the silica-based material comprises about 0.1 wt % to about 70 wt %, and the polymer-based material comprises about 0.1 wt % to 99.9 wt % of the composite electrolyte.

3. The method of claim 1 wherein step (ii) includes drawing the viscous liquid composition through a doctor blade assembly.

4. The method of claim 1 wherein step (iii) includes heating the viscous liquid composition.

5. The method of claim 1 wherein the inorganic cation exchange material comprises about 0.1 wt % to about 30 wt %, the silica-based material comprises about 0.1 wt % to about 15 wt %, and the polymer-based material comprises about 40 wt % to 99 wt % of the composite electrolyte.

6. The method of claim 1 wherein the inorganic cation exchange material is selected from the group consisting of clay, zeolite, hydrous oxide, inorganic and salt.

7. The method of claim 6 wherein the clay includes an aluminosilicate-based exchange material selected from the group consisting of montmorillonite, kaolinite, vermiculite, smectite, hectorite, mica, bentonite, nontronite, beidellite, volkonskoite, saponite, magadite, kenyaite, zeolite, alumina, and rutile.

8. The method of claim 6, wherein the clay is modified to make it more compatible with organic matrices, a clay modification including exfoliation which helps to separate platelets of inorganic substance.

9. The method of claim 6, wherein the clay includes a modified montmorillonite consisting of montmorillonite treated with a modifier material selected from a group consisting of aminododecanoic acid, trimethyl stearate ammonium, octadecylamine, and methyl dihydroxy hydrogenated tallow ammonium.

10. The method of claim 1 wherein the polymer-based material has a linear, branched, or netted morphology.

11. The method of claim 1 wherein the polymer-based material includes one of acrylonitrile/butadiene/stryene rubber (ABS), styrene butadiene/acrylate/acetate polymer blends, epoxides, polypropylene, polycarbonate, polystyrene, polyethylene, polyaryl ethers, and polysulfones.

12. The method of claim 1 wherein the solvent-dispersant comprises water, N-methyl pyrrolidinone, dimethyl sulfoxide, dimethyl acidimide, and dimethylformamide.

13. The method of claim 1 wherein the inorganic cation exchange material, the silica-based material and the polymer-based material comprise 90 wt % or more of the solids content of the composite electrolyte.

14. The method of claim 1 wherein the composite electrolyte when measured in the substantially dried state consists essentially of the inorganic cation exchange material, the silica-based material and the polymer-based material.

15. The method of claim 1 wherein the composite electrolyte has a proton conductivity of about 0.05 S/cm or higher.

* * * * *